United States Patent [19]
Chiodo

[11] Patent Number: 5,417,906
[45] Date of Patent: May 23, 1995

[54] UNIMOLD FILTER AND METHOD

[75] Inventor: Daniel J. Chiodo, Hialeah, Fla.

[73] Assignee: Manufacturers Components, Inc., S. Florida, Fla.

[21] Appl. No.: 159,055

[22] Filed: Nov. 29, 1993

Related U.S. Application Data

[60] Division of Ser. No. 2,636, Jan. 11, 1993, Pat. No. 5,266,194, which is a continuation-in-part of Ser. No. 932,985, Aug. 20, 1992, Pat. No. 5,252,204.

[51] Int. Cl.$^6$ .............................................. B29C 31/04
[52] U.S. Cl. ................................ 264/153; 264/156; 264/255; 264/273; 264/274; 264/DIG. 48; 210/232; 210/497.01; 210/497.3; 210/499
[58] Field of Search ............... 210/232, 474, 477, 482, 210/497.01, 497.2, 499, 497.3, 493.5; 264/153, 154, 155, 156, 255, 273, 274, DIG. 48; 428/139

[56] References Cited

U.S. PATENT DOCUMENTS

| | | | |
|---|---|---|---|
| 3,592,126 | 7/1971 | Drombrowik | 210/474 |
| 4,374,026 | 2/1983 | Greutert | 210/493.5 |
| 4,882,055 | 11/1989 | Stamstad | 210/497.2 |

*Primary Examiner*—John Kim
*Assistant Examiner*—David Reifsnyder
*Attorney, Agent, or Firm*—Oltman and Flynn

[57] ABSTRACT

A filter for separating a fluid and particles immixed in the fluid, including a screen formed of a plurality of mutually attached screen panels, each screen panel defined by respective panel edges, and a molded filter frame including a plurality of molded frame members. The panel edges are molded into the molded frame members.

11 Claims, 3 Drawing Sheets

UNIMOLD FILTER AND METHOD

This application is a division of application Ser. No. 08/002,636, filed Jan. 11, 1993, now U.S. Pat. No. 5,266,194, which is a continuation-in-part application of application Ser. No. 07/932,985 filed Aug. 20, 1992, now U.S. Pat. No. 5,252,204.

The invention relates to a filter for straining liquids containing particles to be separated from the liquid and in particular to a filter composed of a filter screen and a filter frame molded as a single unitary component with the edges and other parts of the filter screen molded into the molded filter frame.

BACKGROUND OF THE INVENTION

Filters for straining liquids containing finely dispersed particles therein are commonly formed as a perforated filter basket with a disposable filter element for example made of filter paper inserted into the filter basket. Filters with disposable filter inserts are inconvenient in use, due to the need for always having disposable paper filters available.

The prior art shows filters wherein a screen and a filter frame are combined in various ways. U.S. Pat. No. 4,374,026 shows for example a basket filter with various filter or screen elements having their adjoining edges embedded in plastic. This filter, however, has the drawback that it is composed of several screen parts that must first be assembled and then embedded in plastic. U.S. Pat. No. 4,882,055 shows a unitary injection molded filter wherein the filter screen and the supporting frame are molded as an integral part. This filter, however, has the drawback that a high degree of fineness of the filter is virtually impossible to attain, since every single hole in the filter screen must be molded into the screen during the molding process.

The filter according to U.S. Pat. No. 4,882,055 therefore is unsuitable for filter applications wherein it is necessary to provide a high degree of fineness of the filter screen.

It is accordingly an object of the instant invention to provide a unitary filter assembly that overcomes the drawbacks of the known filters, is inexpensive to manufacture and can be provided with a high degree of fineness of the filter screen.

Further objects and advantages of this invention will be apparent from the following detailed description of a presently preferred embodiment which is illustrated schematically in the accompanying drawings.

SUMMARY OF THE INVENTION

According to the invention there is provided a filter for separating a fluid and particles immixed in the fluid, comprising a screen panel formed as a frusto cone, the frusto cone having a planar bottom section with a perimeter, and a frusto-conical side section having a larger upper perimeter and a smaller lower perimeter adjoining the bottom section in an edge fold, and a molded filter frame including a plurality of frame members, wherein parts of the screen panel are embedded in the molded frame members.

According to a further feature the filter according to the invention includes in the frame members a larger upper frame member having the upper perimeter embedded therein, and a smaller lower frame member having the edge fold embedded therein, and wherein further the molded filter frame has a plurality of connecting frame members connecting the larger upper frame member and the smaller lower frame member, and wherein the planar section is circular and has a center, including in the molded filter frame a plurality of radial frame members having respective inner and outer ends, the radial frame members connecting the center and the smaller lower frame member at their respective inner and outer ends.

According to still another feature, the filter includes in the screen panel a plurality of holes aligned with the molded frame members, wherein each of the molded frame members has an inner part inside the filter and an outer part outside the filter, and wherein the inner and outer part is connected by bonds through the holes.

According to a further feature, the filter includes a center hole in the center, and a molded center button at the center, and wherein the radial frame members join the center button at their inner ends, wherein the screen panel is made of a woven mesh of wires, the woven mesh of wires includes wires of stainless steel and the woven mesh of wires includes wires of bronze.

According to the invention there is also provided a method of making a filter for separating a fluid and particles immersed in the fluid, wherein the filter is formed as a frusto cone, has a plurality of molded frame members attached to the filter, and wherein the method includes the steps of:

a) cutting with a cutting die a filter screen from a piece of filter material;

b) cutting with a cutting die a plurality of rows of holes aligned with the molded frame members;

c) forming with a forming die the filter screen into a frusto-conical filter basket;

d) forming with an injection mold, having cavities conforming with the molded frame members, the molded frame members attached to the screen with bonds formed in the holes.

The method may further include the step of aligning the injection mold cavities with edges of the filter, and embedding the edges in molded frame members.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
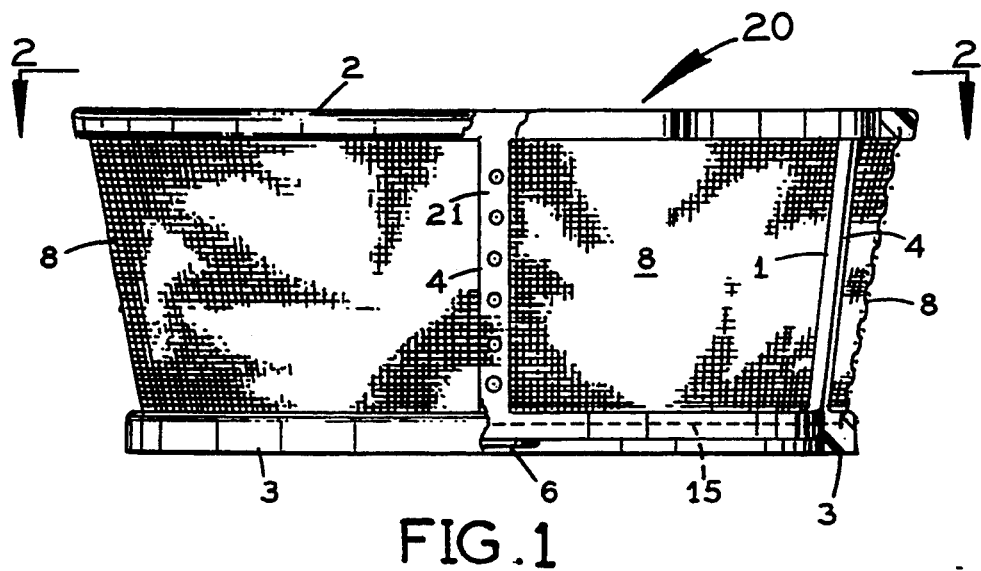
FIG. 1 is an elevational part cross-sectional view of the invention seen along the line 1—1 of FIG. 2.

FIG. 1 shows the filter according to the invention constructed essentially as a basket formed of molded frame members with an upper circular frame member 2, a circular lower frame member 3, and a plurality of molded space members 4 connecting the upper and lower circular frame members 2 and 3. FIG. 1 shows part of the filter broken away as indicated by the line 1—1 of FIG. 2 to show the cross-section of the upper and lower circular frame members.

Figure 2:
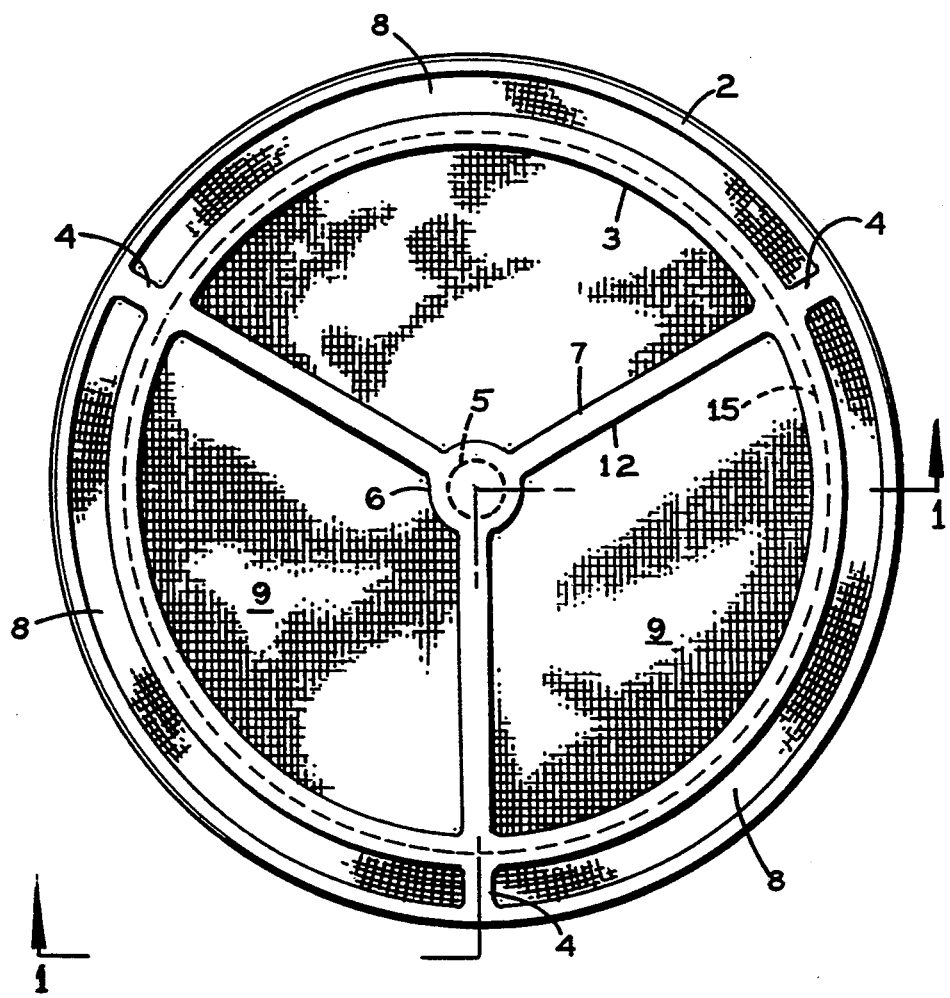
FIG. 2 is a plan view of the invention seen along the line 2—2 of FIG. 1.

FIG. 2 is a top-down plan view of the filter showing the bottom of the filter which includes a center button 6 that connects three radial bottom molded frame members 7 with the lower circular frame member 3.

The upper circular frame member 2 may advantageously be somewhat larger in diameter than the lower circular frame member 3 giving the entire filter frame the shape of an inverted frusto cone.

The molded frame members form between them windows that are filled with screen panels that include a bottom filter panel 9 advantageously of circular shape and a plurality of side filter panels 8.

Figure 3:
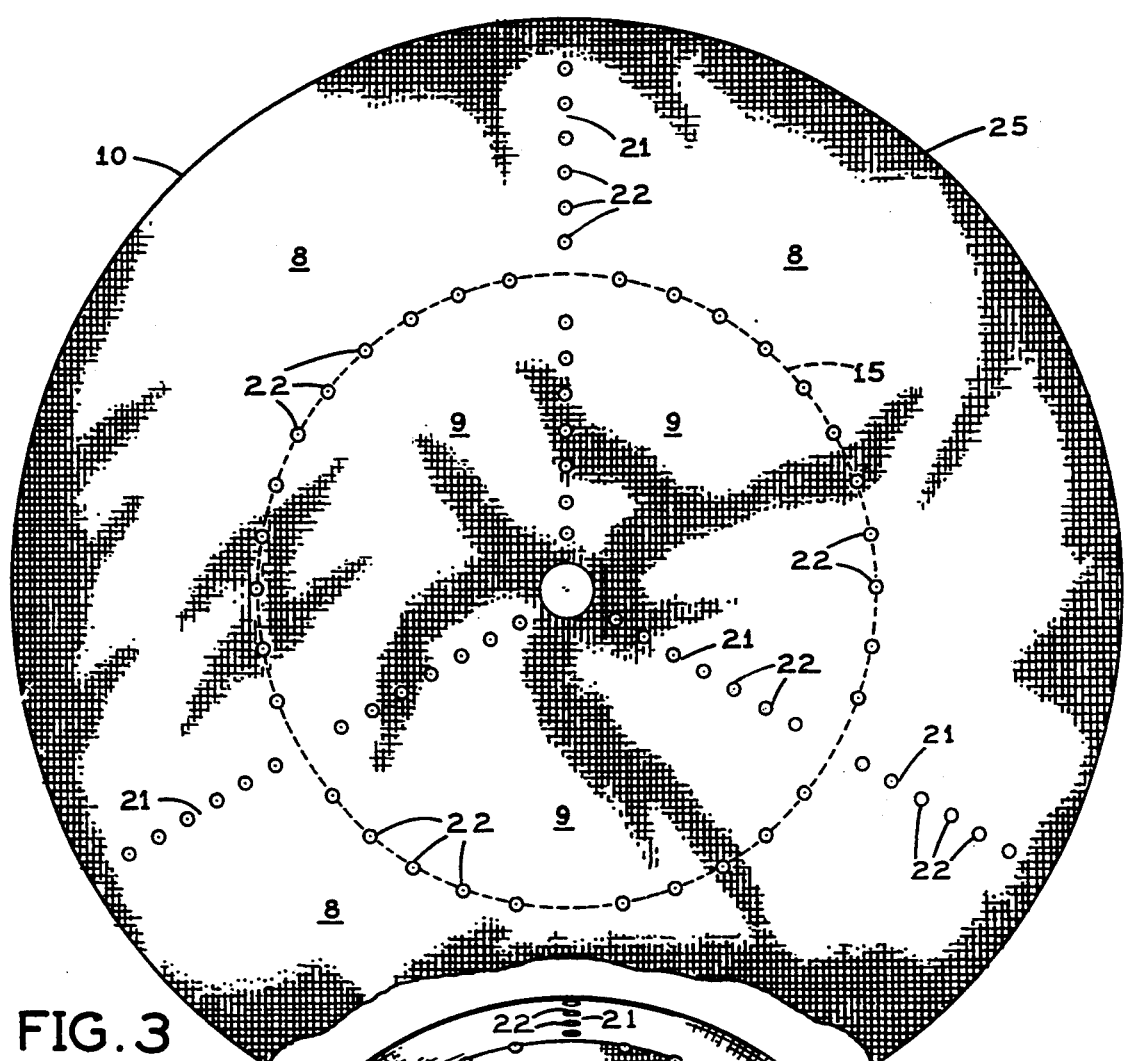
FIG. 3 is a plan view showing the filter screen in unfolded condition.
Figure 4:
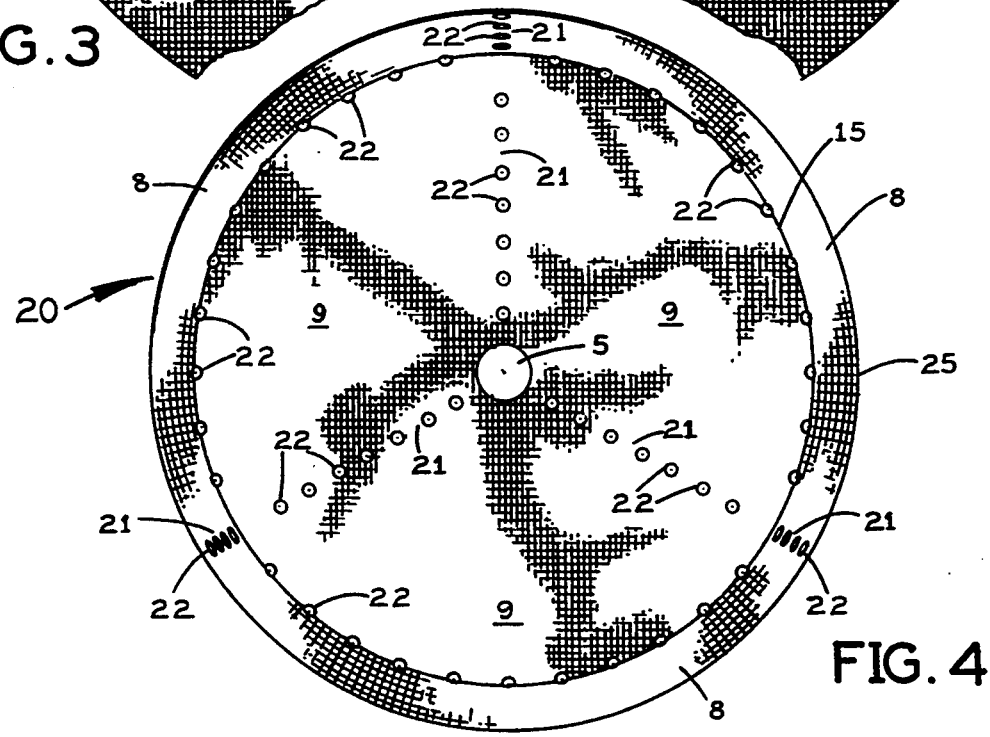
FIG. 4 is a detail view showing the formed filter mesh with rows of holes cut therein.

According to one feature of the invention the entire screen is die cut or stamped as a single flat piece of screen material 10 shown in FIG. 3, which shows a bottom panel 9 and a plurality of e.g. three side panels 8. Each of the side panels 8 are attached along a bottom fold line 15, shown as a dashed line, to the circular bottom section 9 so that the entire screen forms a single unitary piece of screen mesh, wherein later the side panels 8 are formed up to form a frusto-conical filter basket 20 with rows 21 of holes 22 punched into the screen 10 (FIG. 4). The bottom section 9 has a plurality of e.g. 3 radial rows 21 of holes 22. The side panels 8 are similarly defined by rows 21 of holes 22 reaching from the bottom fold line 15 to the upper edge 25.

FIG. 4 is a top down view of the basket of filter mesh after the side panels 8 have been formed up, in a suitable forming die or tool, and the basket 20 is now ready to be inserted into a female part of an injection mold, which has a corresponding male part of the mold. The mold parts have mold cavities aligned with the rows 21 of holes 20, and cavities which respectively form the lower circular molded frame member 3, the radial frame members 7, the space members 4, and has an additional cavity forming the upper circular frame member 2, and a cavity forming the center button 6. All the mold cavities are aligned with the rows 21 of holes 22 so that when the entire molded frame is finished, it embeds the rows 21 of holes 22 and the upper edge 25 of the side panels 8 in the molded members, as seen e.g. in FIG. 2, wherein the rows 21 of the holes 22 fall within the outer boundaries of the molded members.

It follows that the molded members 2,3,4,7 are divided by the screen mesh in an inner part within the filter basket and an outer part on the outside of the basket. The screen mesh is of such fine structure that the molding plastic material will not penetrate the screen, but the holes 22 are large enough that the molding material can form bonds through the holes to insure that the inner and outer parts of the molded members are firmly joined via these bonds.

Figure 5:
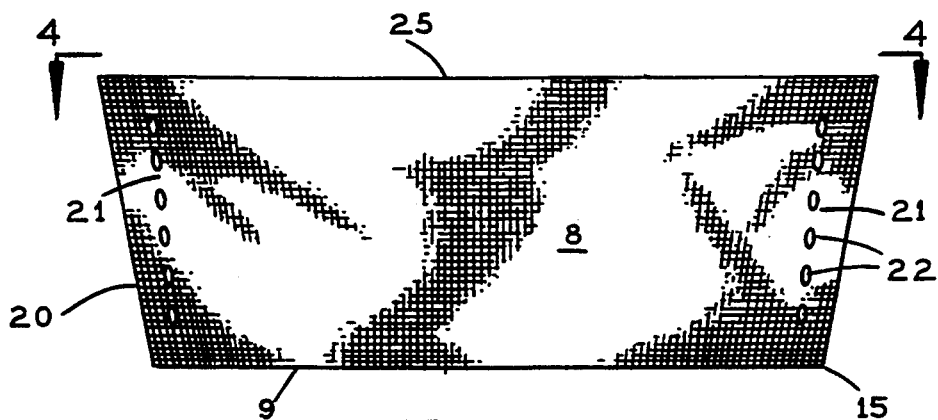
FIG. 5 is an elevational view showing the filter screen after it has been formed.

This arrangement, according to the invention, makes it possible to form the filter in few manufacturing steps, namely stamping out the unitary filter panel 10, seen in FIG. 3, with the rows of holes 22 forming the filter panel 10 into a "basket", as shown in FIG. 4 and 5, by means of a suitable forming mold. After the basket is formed it is inserted in an injection mold which has cavities for forming the molded members. The basket is inserted with the rows of holes 22 aligned with the cavities. Next, hot plastic is injected, filling the cavities, and the completed filter assembly is removed from the mold.

The mechanical details of the mold are not shown in the drawing or described in greater detail since the invention is not directed to the construction of the mold, except for the arrangement of the cavities forming the molded frame members, which are described above.

Figure 7:
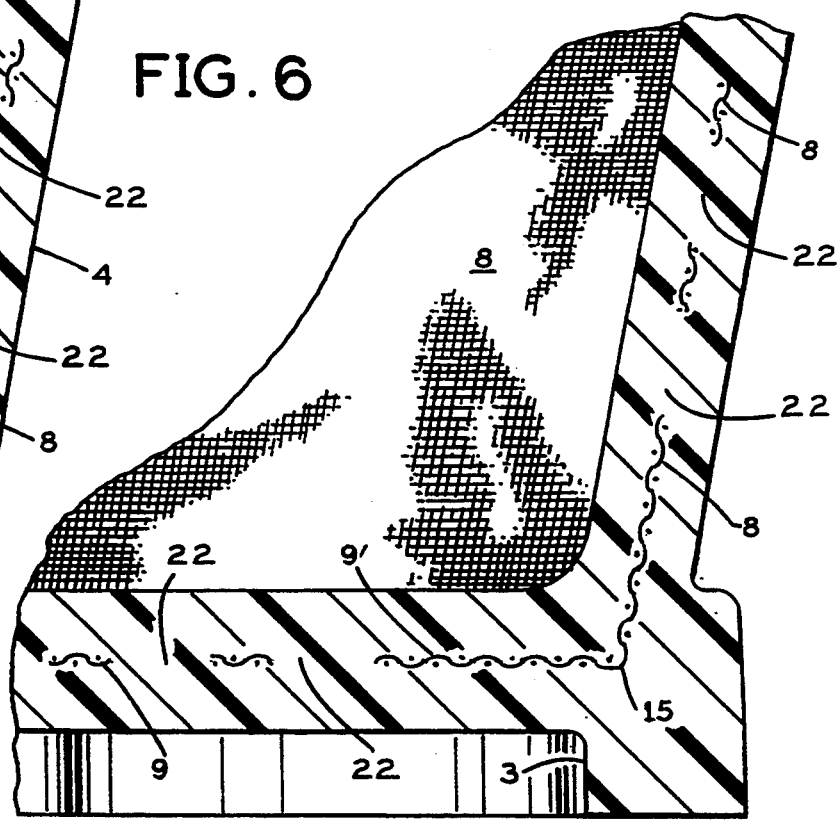
FIG. 7 is a cross-sectional view showing the bottom molded member with the bottom fold of the screen embedded in the bottom circular molded member.

FIG. 7 shows a fragmentary detail of the lower circular frame member 3 with an edge 9' of the bottom panel 9 and the lower folding edge 15 of the side panel 8 embedded in the lower circular frame member 3.

Figure 6:
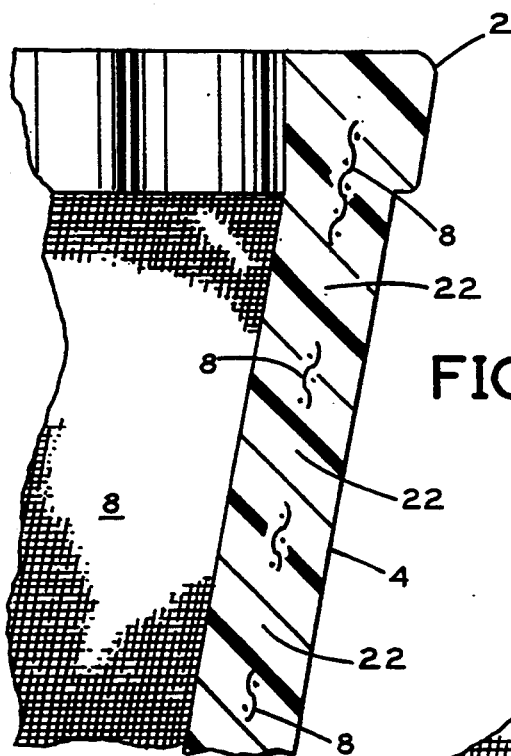
FIG. 6 is a cross-sectional fragmentary enlarged detail view showing an upper edge of the upper circular molded frame member.

FIG. 6 shows a fragmentary detail of the upper circular frame member 2 with an upper edge 25 of one of the side panels 8 embedded therein. An upper end of a space frame member 4 is seen connected to the upper circular frame member 2.

The holes 22 forming the bonds between the inner and outer parts of the molded members are also shown in FIGS. 6 and 7.

I claim:

1. Method of making a filter for separating a fluid and particles immersed in the fluid, the filter formed as a frusto cone, having a plurality of molded frame members attached to said filter, the method comprising the steps of:
   a) cutting with a cutting die a filter screen from a piece of filter material;
   b) cutting with a cutting die a plurality of rows of holes in said filter screen, the plurality of rows of holes being aligned with said molded frame members;
   c) forming with a forming die said filter screen into a frusto-conical filter basket; and
   d) forming the filter with an injection mold, having cavities for making said molded frame members, said filter being made by molten frame member matter flowing into said holes to form a bond between said filter screen and said frame members.

2. Method according to claim 1, wherein said injection mold has cavities aligned with edges of said filter, and embedding said edges in molded frame members.

3. Method according to claim 1, wherein said screen cutting step further includes cutting the filter screen into a circular shape.

4. Method according to claim 1, including the step of: cutting a circular row of holes in the filter screen.

5. Method of making a filter for separating a fluid and particles immersed in the fluid, the filter formed as a frusto cone, having a plurality of molded frame members attached to said filter, the method comprising the steps of:
   a) cutting a filter screen from a piece of filter material;
   b) cutting holes in the filter screen aligned with said molded frame members;
   c) forming said filter screen into a frusto-conical filter basket; and
   d) molding said molded frame members about said filter screen.

6. Method according to claim 5, wherein said filter screen cutting step further includes cutting the filter screen into a circular shape.

7. Method according to claim 5, including the step of: cutting a circular row of holes in the filter screen.

8. Method according to claim 5, wherein said filter screen cutting step further includes cutting the filter screen with a stamp.

9. Method according to claim 5, wherein said plurality of holes cutting step further includes cutting the plurality of holes with a stamp.

10. Method according to claim 5, wherein said forming into a frusto conical shape step further includes forming into a frusto-conical shape with a forming die.

11. Method of making a filter for separating a fluid and particles immersed in the fluid the filter formed as a frusto cone, having a plurality of molded frame members attached to said filter, the method comprising the steps of:
 a) cutting a filter screen from a piece of filter material;
 b) cutting holes in the filter screen aligned with said molded frame members;
 c) forming said filter screen into a frusto-conical filter basket; and
 d) molding said molded frame members about said filter screen;

wherein said molding step further includes inserting said frusto-conical filter basket into an injection mold having cavities for forming the molded members.

* * * * *